(12) United States Patent
Arslan

(10) Patent No.: US 9,659,564 B2
(45) Date of Patent: May 23, 2017

(54) SPEAKER VERIFICATION BASED ON ACOUSTIC BEHAVIORAL CHARACTERISTICS OF THE SPEAKER

(71) Applicant: SESTEK SES VE ILETISIM BILGISAYAR TEKNOLOJILERI SANAYI TICARET ANONIM SIRKETI, Istanbul (TR)

(72) Inventor: Mustafa Levent Arslan, Istanbul (TR)

(73) Assignee: SESTEK SES VE ILETISIM BILGISAYAR TEKNOLOJILERI SANAYI TICARET ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/919,750

(22) Filed: Oct. 22, 2015

(65) Prior Publication Data
US 2016/0118050 A1   Apr. 28, 2016

(30) Foreign Application Priority Data
Oct. 24, 2014   (TR) .............................. a 2014/12527

(51) Int. Cl.
| | | |
|---|---|---|
| *G10L 15/00* | (2013.01) | |
| *G10L 17/00* | (2013.01) | |
| *G10L 21/00* | (2013.01) | |
| *H04M 3/00* | (2006.01) | |
| *G06F 21/00* | (2013.01) | |
| *G10L 17/26* | (2013.01) | |
| *G10L 25/63* | (2013.01) | |
| *G10L 15/07* | (2013.01) | |
| *G10L 15/26* | (2006.01) | |
| *G10L 15/22* | (2006.01) | |

(52) U.S. Cl.
CPC .............. *G10L 17/26* (2013.01); *G10L 25/63* (2013.01); *G10L 15/07* (2013.01); *G10L 15/26* (2013.01); *G10L 2015/227* (2013.01)

(58) Field of Classification Search
CPC ... G10L 25/63; G10L 2015/227; G10L 17/26; G10L 15/26; G10L 15/07
See application file for complete search history.

(56) References Cited

U.S. PATENT DOCUMENTS

| | | | | |
|---|---|---|---|---|
| 4,837,830 A | * | 6/1989 | Wrench, Jr. ............. | G10L 17/00 704/238 |
| 5,036,539 A | * | 7/1991 | Wrench, Jr. ............... | G06F 3/16 704/246 |
| 5,548,647 A | * | 8/1996 | Naik ....................... | G10L 17/22 340/5.52 |
| 5,774,525 A | * | 6/1998 | Kanevsky ............... | G06F 21/31 379/188 |
| 5,983,190 A | * | 11/1999 | Trower, II ................ | G06F 8/00 704/275 |

(Continued)

*Primary Examiner* — Fariba Sirjani
(74) *Attorney, Agent, or Firm* — Gokalp Bayramoglu

(57) ABSTRACT

The present invention relates to a non-standard speech detection system and method whereby a speech is analyzed based on models that are trained using personalized speech for each individual. The model is stored in a database and used to analyze a speech in real time to determine the content and behavior of an individual who is a party to a conversation that produces the speech. The results of the analysis can be used to determine if a conversation takes place under normal circumstances or under extraneous circumstances.

11 Claims, 2 Drawing Sheets

(56) References Cited

U.S. PATENT DOCUMENTS

| | | | |
|---|---|---|---|
| 6,182,037 B1* | 1/2001 | Maes | G10L 17/06 704/245 |
| 6,256,737 B1* | 7/2001 | Bianco | G07C 9/00158 713/186 |
| 6,272,463 B1* | 8/2001 | Lapere | G10L 17/04 704/243 |
| 6,615,174 B1* | 9/2003 | Arslan | G10L 13/033 704/217 |
| 6,697,779 B1* | 2/2004 | Bellegarda | G10L 17/04 704/246 |
| 6,731,307 B1* | 5/2004 | Strubbe | G06N 3/004 704/E17.002 |
| 6,795,808 B1* | 9/2004 | Strubbe | G06F 17/30702 704/270 |
| 7,076,430 B1* | 7/2006 | Cosatto | G10L 21/06 704/272 |
| 7,136,818 B1* | 11/2006 | Cosatto | G10L 15/1807 704/270.1 |
| 7,240,007 B2* | 7/2007 | Junqua | G10L 15/24 704/246 |
| 7,606,701 B2* | 10/2009 | Degani | G10L 17/26 704/207 |
| 7,627,472 B2* | 12/2009 | Trinkel | G06F 21/32 379/189 |
| 7,636,855 B2* | 12/2009 | Applebaum | G06F 21/32 713/186 |
| 7,752,043 B2* | 7/2010 | Watson | G10L 15/32 704/231 |
| 7,844,467 B1* | 11/2010 | Cosatto | G06T 13/40 704/231 |
| 7,940,914 B2* | 5/2011 | Petrushin | G10L 17/26 379/265.06 |
| 7,983,910 B2* | 7/2011 | Subramanian | G10L 19/0018 704/250 |
| 8,130,929 B2* | 3/2012 | Wilkes | H04M 3/4936 370/352 |
| 8,255,223 B2* | 8/2012 | Wang | G06F 21/31 704/246 |
| 8,340,274 B2* | 12/2012 | Saushkin | G06Q 10/06 379/265.01 |
| 8,384,516 B2* | 2/2013 | Fein | G06F 21/32 340/5.51 |
| 8,428,227 B2* | 4/2013 | Angel | G10L 15/26 379/68 |
| 8,442,824 B2* | 5/2013 | Aley-Raz | G10L 17/24 704/247 |
| 8,447,614 B2* | 5/2013 | Capman | G10L 17/02 704/246 |
| 8,493,410 B2* | 7/2013 | Basson | G06F 19/3437 345/629 |
| 8,621,615 B2* | 12/2013 | Zhao | H04L 12/2602 370/252 |
| 8,645,137 B2* | 2/2014 | Bellegarda | G10L 15/07 704/246 |
| 8,660,970 B1* | 2/2014 | Fiedorowicz | G06N 5/043 700/19 |
| 8,694,307 B2* | 4/2014 | Shammass | G10L 25/63 704/211 |
| 8,768,707 B2* | 7/2014 | Mozer | G10L 17/22 704/231 |
| 8,831,208 B2* | 9/2014 | Suendermann | H04M 3/4936 379/265.11 |
| 8,897,500 B2* | 11/2014 | Syrdal | G10L 17/24 382/116 |
| 8,903,725 B2* | 12/2014 | Pilz | G06F 21/32 704/238 |
| 9,042,867 B2* | 5/2015 | Gomar | H04W 12/06 455/411 |
| 9,092,757 B2* | 7/2015 | Antin | G06Q 10/10 |
| 9,094,388 B2* | 7/2015 | Tkachev | H04L 63/08 |
| 9,099,088 B2* | 8/2015 | Washio | G10L 25/48 |
| 9,123,342 B2* | 9/2015 | Chen | G10L 17/26 |
| 9,129,602 B1* | 9/2015 | Shepard | G10L 21/013 |
| 9,147,401 B2* | 9/2015 | Shriberg | G10L 17/02 |
| 9,195,641 B1* | 11/2015 | Fisher | G06F 17/2705 |
| 9,202,466 B2* | 12/2015 | Heckmann | G10L 15/22 |
| 9,223,537 B2* | 12/2015 | Brown | G06F 3/165 |
| 9,262,612 B2* | 2/2016 | Cheyer | G06F 21/32 |
| 9,286,790 B2* | 3/2016 | Lyman | G08B 25/12 |
| 9,305,553 B2* | 4/2016 | Meisel | G10L 15/07 |
| 9,311,680 B2* | 4/2016 | Kim | G06Q 50/01 |
| 9,318,114 B2* | 4/2016 | Zeljkovic | G10L 17/24 |
| 9,368,114 B2* | 6/2016 | Larson | H04M 1/72522 |
| 9,378,741 B2* | 6/2016 | Coussemaeker | G10L 15/265 |
| 9,386,146 B2* | 7/2016 | Gainsboro | H04M 3/2281 |
| 9,390,706 B2* | 7/2016 | Gustafson | G10L 15/265 |
| 9,401,925 B1* | 7/2016 | Guo | H04L 63/1416 |
| 9,424,837 B2* | 8/2016 | Talhami | G10L 15/063 |
| 9,443,521 B1* | 9/2016 | Olguin Olguin | G10L 17/00 |
| 9,495,350 B2* | 11/2016 | John | G06F 17/27 |
| 9,576,157 B2* | 2/2017 | Fitzgerald | G06F 21/88 |
| 9,576,593 B2* | 2/2017 | Pakhomov | G10L 25/78 |
| 2001/0049785 A1* | 12/2001 | Kawan | G06Q 20/3674 713/156 |
| 2002/0147914 A1* | 10/2002 | Arnold | G06F 21/32 713/186 |
| 2003/0046083 A1* | 3/2003 | Devinney, Jr. | G06Q 20/00 704/273 |
| 2003/0084289 A1* | 5/2003 | Watanabe | G06F 21/32 713/168 |
| 2006/0106605 A1* | 5/2006 | Saunders | G10L 17/04 704/246 |
| 2006/0122834 A1* | 6/2006 | Bennett | G10L 15/1822 704/256 |
| 2007/0027687 A1* | 2/2007 | Turk | G10L 21/00 704/246 |
| 2007/0174080 A1* | 7/2007 | Outwater | G06Q 20/10 705/42 |
| 2007/0185718 A1* | 8/2007 | Di Mambro | G06F 21/32 704/273 |
| 2007/0213987 A1* | 9/2007 | Turk | G10L 13/033 704/268 |
| 2009/0006856 A1* | 1/2009 | Abraham | G06F 21/55 713/183 |
| 2009/0313165 A1* | 12/2009 | Walter | G06F 21/35 705/41 |
| 2010/0036660 A1* | 2/2010 | Bennett | G10L 17/26 704/231 |
| 2011/0246196 A1* | 10/2011 | Bhaskaran | G10L 17/24 704/235 |
| 2012/0010879 A1* | 1/2012 | Tsujino | G10L 19/06 704/203 |
| 2012/0253807 A1* | 10/2012 | Kamano | G10L 25/63 704/240 |
| 2013/0097682 A1* | 4/2013 | Zeljkovic | H04L 9/3231 726/7 |
| 2013/0347129 A1* | 12/2013 | Samuelsson | H04L 9/321 726/28 |
| 2015/0106102 A1* | 4/2015 | Chebiyyam | G10L 19/0208 704/262 |
| 2015/0156328 A1* | 6/2015 | Arslan | G06F 21/42 379/88.02 |
| 2015/0302846 A1* | 10/2015 | Song | H04W 56/001 704/275 |
| 2015/0350438 A1* | 12/2015 | Arslan | G10L 25/63 379/88.01 |
| 2015/0379985 A1* | 12/2015 | Wang | G10L 15/07 704/250 |
| 2016/0118050 A1* | 4/2016 | Arslan | G10L 17/26 704/235 |
| 2016/0125419 A1* | 5/2016 | Arslan | G10L 25/51 705/304 |

\* cited by examiner

SPEAKER VERIFICATION BASED ON ACOUSTIC BEHAVIORAL CHARACTERISTICS OF THE SPEAKER

TECHNICAL FIELD

The present invention relates to a speech detection system and method that is capable of detecting a non-standard speech that takes place in platforms using, a voice communication.

BACKGROUND OF THE INVENTION

Telephone communication can be used to carry out most financial transactions such as banking transactions, e-commerce and others. In these transactions, a user's identity can be protected by using password control, one time password (OTP) entry, or biometric verification when a transaction is performed by voice over a transmission media such as a telephone. Identity verification can be done either by a machine or a human operator. Various security modes may be used to verify the identity of a caller. There is always a possibility that an individual who can provide a positive identification may be doing so under duress in which case a caller may be acting against his/her will. This presents a serious threat. A similar situation may arise during a cash transaction.

The current systems that detect a caller's emotion use the voice of a caller to detect the content of the speech or the change in caller's emotion in the speech. These systems use common speech models that are generated from a common database and therefore they perform the transaction over common voice models prepared over a common database. In this type of applications, training algorithms for mood models use general data and therefore common emotional features of all people in the database are extracted. As an example, an angry model can be generated from the analysis of an angry conversation. However, this increases the emotion detection error rate because of the use of a general database during the training of the model. Tone and way of speech may vary from one individual to another. An individual's angry tone of voice may be considered to be a normal speech for another individual. These differences affect the operation of the model and therefore resulting an error in identifying the mood in a speech. There is no known method where an individual's speech pattern is analyzed by using a model that is trained by using that individual's speech.

SUMMARY OF THE INVENTION

An objective of the present invention is to realize a non-standard speech detection system and method, which is capable of analyzing human voice to detect the speech style of an individual.

Another objective of the present invention is to realize a non-standard speech detection system and method, which is capable of transmitting non-standard speech to related units in the event that a speech is detected.

Another objective of the present invention is to realize a non-standard speech detection system and method that uses a model that is trained by a personalized speech and not trained by others' speech therefore increasing the accuracy rate of the system.

Another objective of the present invention is to realize a non-standard speech detection system and method which is trained by using personalized speech that includes content and behavioral features embedded in it, in addition to using acoustic features of the speech.

Another objective of the present invention is to realize a non-standard speech detection system and method which will increase security level and reliability of transactions carried out in restricted-access electronic fields such as telephone banking, call centers, telephone shopping and conversations made in physical environments such as banks, cash points as well. In the event that an individual's speech style differs from that individual's standard speech style, the system detects the difference in the speech style and communicates with the related units. If there are changes in the voice of an individual during conversation depending on stress, anger, psychological state, etc. the system is capable of detecting that change.

Another objective of the present invention is to realize a non-standard speech detection system and method that is capable of detecting and communicating a speech that is out of norm.

BRIEF DESCRIPTION OF THE DRAWINGS

"A non-standard speech detection system and method" realized to fulfil the objectives of the present invention is shown in the figures attached, in which.

DETAILED DESCRIPTION OF THE INVENTION

Figure 1:
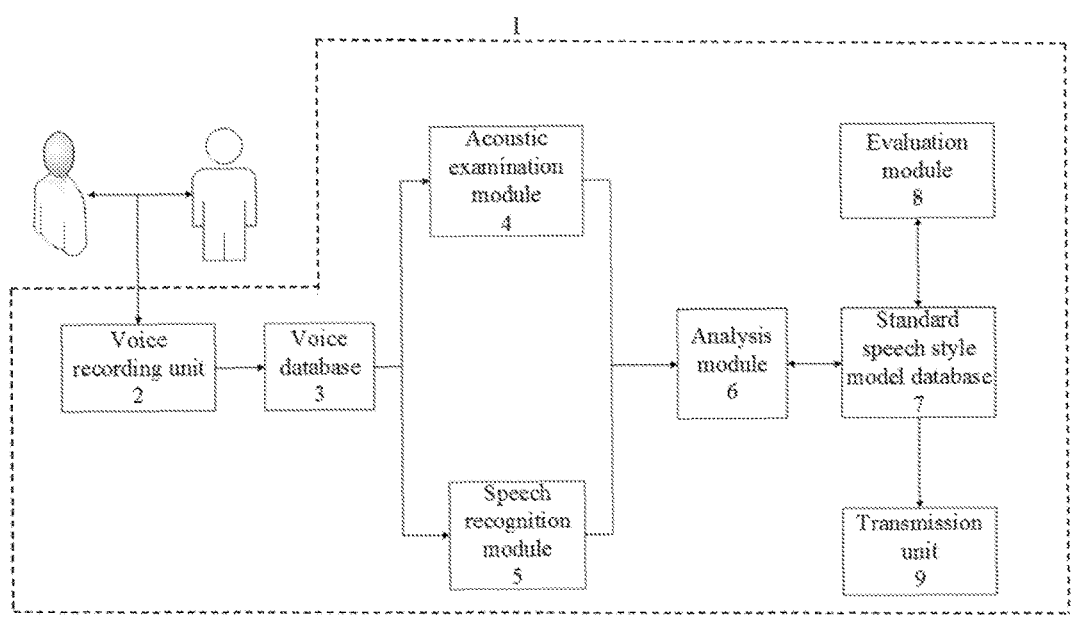
FIG. 1 is a view of the non-standard speech detection system.
Figure 2:
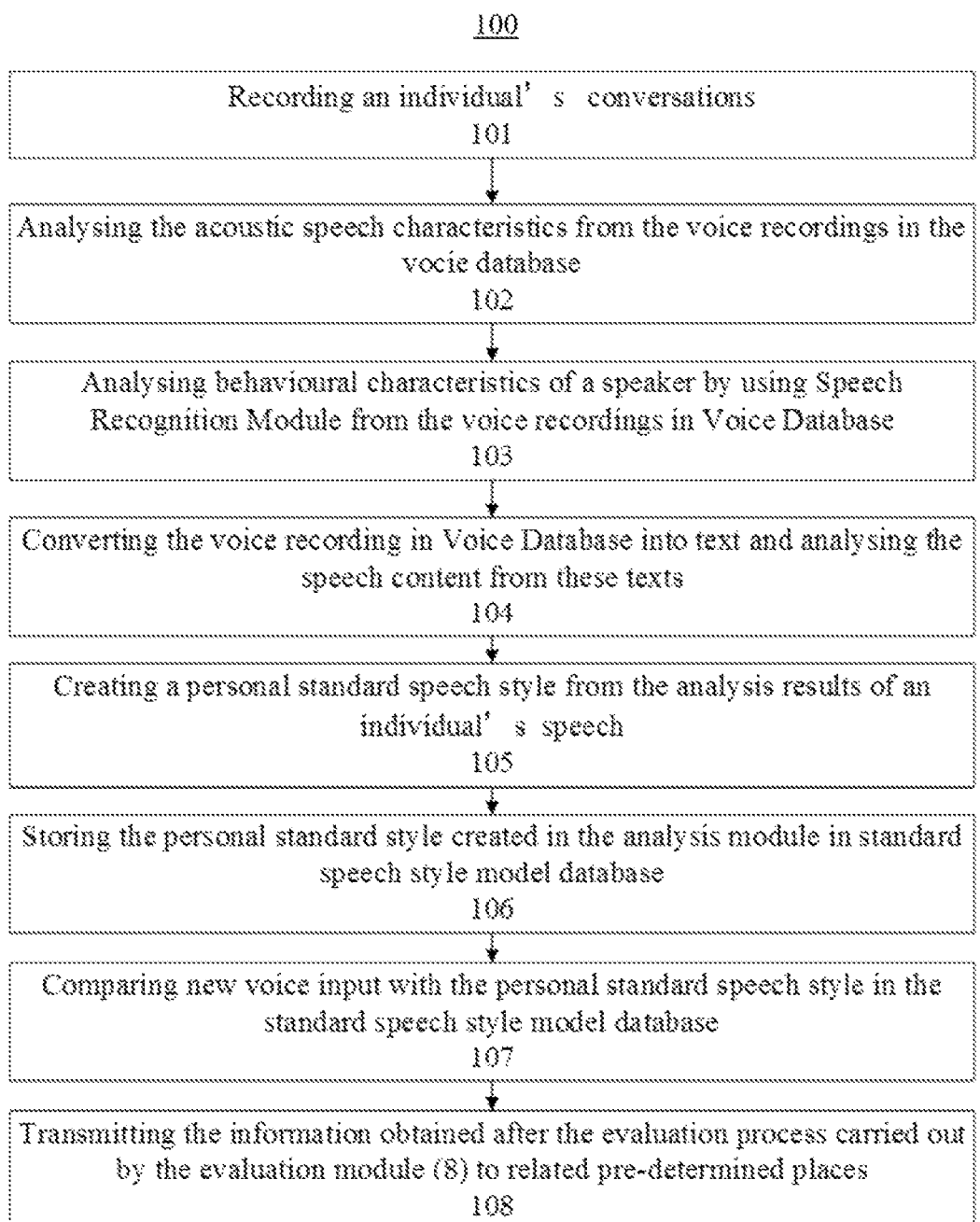
FIG. 2 is a view of the steps of the non-standard speech detection method.

The components illustrated in the figures are individually numbered, where the numbers refer to the following:
1. Non-standard speech detection system
2. Voice recording unit
3. Voice database
4. Acoustic examination module
5. Speech recognition module
6. Analysis module
7. Standard speech style model database
8. Evaluation module
9. Transmission unit
100. Non-standard speech detection method;
101. The voice-recording unit (2) for recording an individual's conversations, which are made by him/her over a voice communication channel, to the voice database (3);
102. The acoustic examination module (4) analyzing the acoustic speech characteristics from the voice recordings in the voice database (3);
103. Analyzing behavioral characteristics of a speaker by using the speech recognition module (5) from the voice recordings in the voice database (3);
104. The speech recognition module (5) converting the voice recordings in the voice database (3) into text and analyzing the speech content from these texts;
105. The analysis module (6) creating a personal standard speech style from the analysis results of an individual's speech characteristics, speech content and behavioral characteristics;
106. Storing the personal standard speech style created in the analysis module (6) in the standard speech style model database (7);
107. The evaluation module (8) comparing new voice input with the personal standard speech style in the standard speech style model database (7);

108. The transmission unit (9) transmitting the information obtained after the evaluation process carried out by the evaluation module (8) to related pre-determined places.

Non-standard speech detection system (1) that is capable of analyzing human voice to detect the speech style of an individual, comprising:

At least one voice recording unit (2) for recording standard speech of an individual;

At least one voice database (3) wherein the voices recorded by voice recording unit (2) are stored;

At least one acoustic examination module (4) which for determining acoustic speech characteristics of an individual from the voice recordings stored in voice database (3);

At least one speech recognition module (5) for determining behavioral characteristics of an individual from the voice recordings stored in voice database (3) and is capable of speech analyzing by converting the voice recording of an individual into text;

At least one analysis module (6) for creating a personal standard speech style model by examining the individual characteristics determined as a result of examining acoustic examination module (4) and speech recognition module (5);

At least one standard speech style model database (7) wherein the standard speech style models created by analysis module (6) are recorded in a personalized way;

At least one evaluation module (8) which compares a new voice input of an individual with the recorded standard speech style;

At least one transmission unit (9) that is capable of transmitting the result reached after the comparison of evaluation module (8) to related units.

Analysis module (6) analyses and extracts the speech content and behavioral characteristics of a speech. Analysis Module (6) detects non-standard speech style by comparing a new speech with stored speeches in Model Database (7). Transmission Unit (9) communicates the result of the comparison made in Analysis Unit (6) to the other units.

Voice Recording Unit (2) records speeches of an individual to be used to create a personal standard speech style model. Speech recordings can be obtained from call center conversations, which are performed in each individual's own standard speech style. In an embodiment of the invention, it is possible to initiate an external call with an individual or ask an individual to leave a voice recording during that individual's first call in order to store the voice recording of the individual. This recording of the individual is used for creating the model.

All voice recordings are performed by Voice Recording Unit (2) and the results are stored in Voice Database (3). The storing step is performed for each individual. As a result of the analysis of these recordings, personal acoustic, speech content and behavioral characteristics of each individual are extracted and personal standard speech style models are created.

Acoustic Examination Module (4) determines the acoustic characteristics of individual's speech by analyzing the recordings stored in Voice Database (3). A large number of acoustic parameters are evaluated in order to determine acoustic characteristics of a speech. In a preferred embodiment of the invention, Acoustic Examination Module (4) uses acoustic parameters such as prosodic parameters, pitch frequency, emphasis parameters, energy, spectrum parameters, duration parameters, Mel Frequency Cepstral Coefficients, harmonics, jitter and shimmer in order to determine acoustic. characteristics. Speech Recognition Module (5) determines the behavioral characteristics of an individual from that individual's voice recording. In a preferred embodiment of the invention, behavioral characteristics of an individual's speech are related to parameters such as speaking speed, monotony, hesitance, and interruption interval for the other party, speech overlap with the other party. Speech behavioral characteristics may vary from one individual to another individual; therefore determining personal behavioral characteristics is an important factor in the accuracy of detection. General models that are trained by using the speeches of many people may lead to error during non-standard speech detection. For example, voice of an individual who talks monotonously and hesitantly in daily life may be considered as non-standard when it is compared to general behavioral characteristics. This may cause misunderstandings and may generate erroneous results.

In a preferred embodiment of the invention, Speech Recognition Module (5) automatically converts the voice recording of an individual into text and extract speech content characteristics of a customer by performing content analysis. Speech content is related to different parameters such as sentence patterns, word and phrases, language model n-gram parameters, semantic parameters, content, context and shape parameters used in an individual's daily life. For example, it is possible that an individual may talk differently than his/her standard speech style when that individual is under stress.

Analysis Module (6) analyses the content of speech, behavioral characteristics of speech, and acoustic speech characteristics. Personal standard speech style models are generated based on the results obtained from Analysis Module (6) Personal standard speech style models are stored in the Standard Speech Style Model Database (7).

When an individual/customer wants to carry out transaction or get information over various speech channels, that individual is welcomed by a voice recording by a machine or a customer representative and voice communication is established. Acoustic, speech content and behavioral characteristics to be obtained from instant voice data taken from the customer during this conversation are extracted by Acoustic Examination Module (4) and Speech Recognition Module (5). Evaluation Module (8) compares the characteristics obtained from the system modules with the recorded personal standard speech style models and decides whether the individual's speech is a standard or non-standard speech.

Transmission Unit (9) informs the related units when there is a speech that is different than the standard speech style. In an embodiment of the invention, Transmission Unit (9) may send information to call center supervisors, security department officials, customer representatives or cashier officers by way of an e-mail, an sums, or pop-up methods depending on the application type. The information may also be reflected on the screen of an electronic device (PC, tablet, smart phone, etc.) of a related individual over an interface.

Reference models to be used for detecting non-standard speech style are trained by using personalized data but not by using general data. Model training, and reference recordings are obtained from an individual's standard speech by the system modules. The fact that the system will be designed in a personalized way increases the accuracy rate of the system and enhances the system's efficiency.

In an embodiment of the invention, Non-Standard Speech Detection System (1) can be applied to the speech of a customer representative in addition to a customer. For example, a customer representative's speech may change and the voice of a customer representative may alter if a customer representative gets tired after long and frequent conversations. This tiredness leads to a change in speech style of customer representative. In the event that Non-Standard Speech Detection System (1) is applied to a customer representative. Transmission Unit (9) provides information to a customer representative or a pre-determined authorized person in the event that the Evaluation Module (8) determines that the speech style of a customer representative during conversation changes and alters from the standard speech style. The customer representative or the authorized person can take necessary action by using this information. For example, a customer representative having conversation for a long time and getting information that his/her speech is becoming different from the standard speech style knows that s/he needs to take a break and rest. In another embodiment, a communication channel controller will be able to watch speech style of a customer representative and in the event that his/her speech becomes different from the standard, the person will be able to take necessary action.

The inventive non-standard speech detection system (1) can be used in all necessary fields.

The inventive non-standard speech detection method (100) comprises steps of:

Recording an individual's conversations, which are made by him/her over a voice communication channel, to Voice Acoustic Examination Module (4) (101);

Analyzing the acoustic speech characteristics from the voice recordings in the voice database (3) (102);

Analyzing behavioral characteristics of a speaker by using Speech Recognition Module (5) from the voice recordings in Voice Database (3) (103);

Converting the voice recordings in Voice Database (3) into texts and analyzing the speech content from these texts (104);

Creating a personal standard speech style from the analysis results of an individual's speech characteristics, speech content and behavioral characteristics (105);

Storing the personal standard speech style created in the analysis module (6) in standard speech style model database (7) (106);

Comparing new voice input with the personal standard speech style in the standard speech style model database (7) (107);

Transmitting the information obtained after the evaluation process carried out by the evaluation module (8) to related pre-determined places (108).

The inventive non-standard speech detection method (100) is related to performing personal analysis from voices of persons who want to carry out transaction by establishing voice communication over various communication channels or customer representatives who help customers during transaction, and detecting non-standard speech.

In the inventive non-standard speech detection method (100), Voice Recording Unit (2) records an individual's conversations, which are made by that individual over a voice communication channel, to Voice Database (3) (101). In an embodiment of the invention, the communication channel may be restricted-access electronic fields such as telephone banking transactions, conversations made with call centers, telephone shopping and also conversations made in physical environments such as banks and cash points. During these conversations, speeches of a customer and/or a customer representative, and cashier are recorded in their own voice databases (3) individually.

Acoustic Examination Module (4) analyses the acoustic speech characteristics from the voice recordings in Voice Database (3) (102). Acoustic characteristics of speech may vary from an individual to another individual. An individual who talks aloud in daily life will likely have a high volume voice when that individual carries out a voice banking transaction over a telephone. It would be a mistake to conclude that the loud speech of an individual is a non-standard speech. Same situation applies to people who talk monotonously and with in a low volume of voice in daily life. In order to prevent these and similar mistakes, speeches of each individual are recorded individually and each voice recording is evaluated by Acoustic Examination Module (4) separately in inventive Non-Standard Speech Detection Method (100).

Speech Recognition Module (5) analyses the behavioral characteristics of a speaker by using the voice recordings of the speaker stored in Voice Database (3) (103). Behavioral characteristics vary from an individual to another individual. Therefore, examining behavioral characteristics of each individual increases accuracy rate of the system. Speech Recognition Module (5) examines the daily standard speeches of an individual that are stored in Voice Database (3) and analyses the behaviors of an individual and reflections thereof on that individual's voice and creates behavioral profile of that individual. This analysis is important for Evaluation Module (8) in order to examine variations depending on stress in that individual's voice, anger, and psychological state during a new conversation.

In Non-Standard Speech Detection System (1), Speech Recognition Module (5) converts the voice recordings in Voice Database (3) into texts and analyses the speech content from these texts (104). Voice tone or behavioral characteristics of an individual during a conversation may vary according to the content of the conversation. For example, it is possible that an individual, who is not pleased with his/her previous shopping experience, may want to cancel a transaction. During this cancellation process, the individual may talk louder. However, loud conversation may be the standard for this individual. Accordingly, determining in which tone and characteristic of speech would be standard for an individual depends on the content of the speech as well.

In Non-Standard Speech Detection System (1), Analysis Module (6) creates a personal standard speech style from the analysis results of an individual's speech characteristics, speech content and behavioral characteristics (105). The personal standard speech created by Analysis Module (6) is stored in Standard Speech Style Model Database (7) (106). Accordingly, Evaluation Module (8) compares new voice input with the personal standard speech style in Standard Speech Style Model Database (7) (107) when the speaker engages in a new voice conversation.

Speech styles other than a standard speech style may occur for different reasons. An individual may be angry, may be under stress or his/her psychological state may be different on a given day that may cause the person to talk differently than his/her standard speech style. Such cases may occur due to many different reasons. The fact that an individual is forced to carry out a transaction without his/her will is one of the examples that may lead to critical results. In circumstances where an individual is under stress or duress, it is normal that differences in an individual's speech may be noticeable. An individual would talk in a nervous, and stressful way. In these circumstances, Evaluation Module (8) will determine that the individual's speech does not match with the standard speech style models in the database. Transmission Unit (9) transmits the information obtained after the evaluation process carried out by Evaluation Module (8) to related pre-determined places (108). Due to this feedback, a transaction carried out during for example a voice call can be regarded as invalid depending on the subject and the related security departments can be informed and such preventive measures can be taken. Thus, security of transactions carried out by people via voice call is enhanced. An out of ordinary situation is detected by the system and security forces are notified.

In an embodiment of the invention, if it is determined by Evaluation Module (8) that instant voice input of a customer carrying out banking transaction over telephone is considered not to be standard speech style, the result is communicated to a customer representative and the customer representative may indirectly ask the customer to say a pre-determined password in urgent/risky situations between the customer and the hank. If it is determined that there is a security risk, then the transaction is regarded as invalid by the hank and this situation is reported to the related security departments.

Non-Standard Speech Detection System (1), and method (100) cannot be limited to the examples disclosed herein.

The invention claimed is:

1. A non-standard speech detection system that is capable of analyzing human voice to detect the speech style of an individual for verifying identity of the individual according to his speech style, the system comprising:
    at least one voice recording unit for recording personal standard speeches of the individual in his/her normal life;
    at least one voice database wherein the personal standard speeches recorded by the voice recording unit are stored as voice recordings;
    at least one acoustic examination module for determining acoustic speech characteristics of the individual from the voice recordings stored in the voice database;
    at least one speech recognition module for determining behavioral characteristics and speech content characteristics of the individual from the voice recordings stored in the voice database and capable of making speech analysis by converting the voice recordings into text;
    at least one analysis module for creating a personal standard speech style model by examining the acoustic speech characteristics and the behavioral speech characteristics of the individual determined by the acoustic examination module and the speech content characteristics of the individual determined by the speech recognition module;
    at least one personal standard speech style model database wherein the personal standard speech style models created by the analysis module are recorded in a personalized way;
    at least one evaluation module for comparing a new voice input with the recorded personal standard speech style models;
    at least one transmission unit capable of transmitting result reached after the comparison of the evaluation module to related units,
    wherein the speech content characteristics of the individual include sentence patterns, words and phrases, language model n-gram parameters, and semantic parameters obtained from the text,
    wherein the evaluation module evaluates whether speech content characteristics, acoustic speech characteristics, and behavioral speech characteristics of the new voice input match the personal standard speech style model of the individual and verifies identity of a caller producing the new voice if a match occurs,
    wherein the behavioral speech characteristics of the individual include speech behavioral characteristic parameters of the individual, interruption interval for another party to the conversation, and speech overlap with the other party, and
    wherein the speech behavioral characteristic parameters include speaking speed, monotony, hesitance, and loudness of voice.

2. The non-standard speech detection system according to claim 1, wherein the voice recording unit records standard speeches of the individual by means of recording conversations made over voice communication channels and/or requesting voice recording from the individual.

3. The non-standard speech detection system according to claim 1, wherein the personal standard speeches collected by the voice recording unit are recorded in a personalize way individually.

4. The non-Standard speech detection system according to claim 1, wherein the related pre-determined places include financial and e-commerce institutions that require verification of the caller.

5. The non-standard speech detection system according to claim 1, wherein the evaluation module determines whether the speech is performed in a stand/non-standard way by comparing the new voice inputs taken in the individual's communications made over a voice communication channel with the personal speech style models of the individual recorded in the standard speech style model database.

6. The non-standard speech detection system according to claim 1,
    wherein the transmission unit provides feedback by sending a message with e-mail, SMS, or pop-up methods and reflecting information on a screen of an electronic device of a related entity requesting the verification of the caller over an interface, and
    wherein the electronic device is selected from a group consisting of PC, tablet and smart phone.

7. A non-standard speech detection method for verifying identity of a caller according to his speech, the method comprising the steps of:
    recording, to a database, conversations of an individual made by the individual over a voice communication channel to obtain voice recordings including voice of the individual;
    analyzing acoustic speech characteristics from the voice recordings in the voice database to obtain speech characteristics of the individual;
    analyzing behavioral characteristics of the individual by using a speech recognition module applied to the voice recordings in the voice database to obtain behavioral characteristics of the individual;
    converting the voice recordings in the voice database into texts and analyzing the speech content of the individual from the texts;
    creating a personal standard speech style from the speech characteristics, the behavioral characteristics, and the speech content;
    storing the personal standard speech style in a standard speech style model database;
    comparing acoustic speech characteristics and content of a new voice input from a caller with the personal standard speech style in the standard speech style model database;
    evaluating whether the new voice matches the personal standard speech style;

verifying identity of the caller according to results of the evaluating to obtain a verification of the identity of the caller;

transmitting the the verification of the identity of the user to related pre-determined places, wherein the step of analyzing speech content of the individual includes obtaining sentence patterns, words and phrases, language model n-gram parameters, and semantic parameters from the content of the text, wherein the step of analyzing behavioral characteristics of the individual by using the speech recognition module applied to the voice recordings in the voice database comprises:

evaluating speech behavioral characteristic parameters of the individual, interruption interval for another party to the conversation, and speech overlap with the other party, wherein the speech behavioral characteristic parameters include speaking speed, monotony, hesitance, and loudness of voice.

8. The non-standard speech detection method according to claim 7, the step of analyzing the acoustic speech characteristics from the voice recordings in the voice database, comprises:

using acoustic parameters, which are selected from a group consisting of prosodic parameters, pitch frequency, emphasis parameters, energy, spectrum parameters, duration parameters, Mel Frequency Cepstral Coefficients, harmonics, jitter and shimmer.

9. The non-standard speech detection method according to claim 7, wherein at the step of "creating a personal standard speech style from the analysis results of the individual's speech characteristics, speech content and behavioral characteristics"; acoustic speech characteristics, speech content and behavioral characteristics are obtained from system modules.

10. The non-standard speech detection method according to claim 7, wherein the related pre-determined places include financial and e-commerce institutions that require verification of the caller.

11. The non-standard speech detection method according to claim 7, wherein a transmission unit provides feedback by sending message with e-mail, SMS, pop-up methods and reflecting information on screen of an electronic device of the individual over an interface at the step of "transmitting the information obtained after the evaluation process carried out by the evaluation module to related pre-determined places", the electronic device is selected from a group consisting of PC, tablet and smart phone.

* * * * *